United States Patent
Poulain et al.

(10) Patent No.: US 10,749,619 B2
(45) Date of Patent: Aug. 18, 2020

(54) METHOD AND PIECE OF EQUIPMENT FOR GENERATING AN ORIGINAL WHOLE DATA STREAM AND A MODIFIED WHOLE DATA STREAM, INTENDED TO BE BROADCAST BY A BROADCASTING SITE AND A REBROADCASTING SITE, RESPECTIVELY

(71) Applicant: ENENSYS TECHNOLOGIES, Cesson-Sevigne (FR)

(72) Inventors: Ludovic Poulain, Domloup (FR); Benoit Chauviere, Pace (FR); Benoit Bui Do, Rennes (FR)

(73) Assignee: ENENSYS TECHNOLOGIES, Cesson-Sevigne (FR)

( * ) Notice: Subject to any disclaimer, the term of this patent is extended or adjusted under 35 U.S.C. 154(b) by 92 days.

(21) Appl. No.: 16/074,984

(22) PCT Filed: Feb. 2, 2017

(86) PCT No.: PCT/EP2017/052238
§ 371 (c)(1),
(2) Date: Aug. 2, 2018

(87) PCT Pub. No.: WO2017/134157
PCT Pub. Date: Aug. 10, 2017

(65) Prior Publication Data
US 2019/0052385 A1  Feb. 14, 2019

(30) Foreign Application Priority Data

Feb. 2, 2016  (FR) .................................... 16 50828
Feb. 4, 2016  (FR) .................................... 16 50893

(51) Int. Cl.
*H04H 60/07*  (2008.01)
*H04H 20/06*  (2008.01)
(Continued)

(52) U.S. Cl.
CPC ............ *H04H 60/07* (2013.01); *H04H 20/06* (2013.01); *H04H 20/18* (2013.01); *H04H 20/67* (2013.01);
(Continued)

(58) Field of Classification Search
None
See application file for complete search history.

(56) References Cited

PUBLICATIONS

International Search Report dated Mar. 24, 2017 for corresponding International Application No. PCT/ EP2017/052238, filed Feb. 2, 2017.
(Continued)

*Primary Examiner* — Justin E Shepard
(74) *Attorney, Agent, or Firm* — David D. Brush; Westman, Champlin & Koehler, P.A.

(57) ABSTRACT

A method for generating an original total stream intended for being distributed to at least one broadcasting site, which includes a modulator and a transmitter sending a radiofrequency signal on a first frequency. The method implements the following acts: obtaining at least one transport stream comprising at least one transport packet; obtaining, from at least one modulation parameter for the broadcasting site, at least one starting instant of a modulation frame intended for being sent by the broadcasting site; inserting at least one modulation information packet in the at least one transport stream, at a position determined from the at least one starting instant; and generating the original total stream, including at least one physical layer pipe encapsulating the at least one transport stream carrying the at least one modulation information packet.

15 Claims, 6 Drawing Sheets

(51) Int. Cl.

| | |
|---|---|
| *H04H 20/67* | (2008.01) |
| *H04H 20/72* | (2008.01) |
| *H04H 60/40* | (2008.01) |
| *H04N 21/80* | (2011.01) |
| *H04N 21/21* | (2011.01) |
| *H04N 21/60* | (2011.01) |
| *H04N 21/85* | (2011.01) |
| *H04N 21/61* | (2011.01) |
| *H04N 21/65* | (2011.01) |
| *H04N 21/654* | (2011.01) |
| *H04N 21/20* | (2011.01) |
| *H04H 20/18* | (2008.01) |
| *H04N 21/8547* | (2011.01) |

(52) U.S. Cl.
CPC ............ *H04H 20/72* (2013.01); *H04H 60/40* (2013.01); *H04N 21/20* (2013.01); *H04N 21/21* (2013.01); *H04N 21/60* (2013.01); *H04N 21/61* (2013.01); *H04N 21/615* (2013.01); *H04N 21/6106* (2013.01); *H04N 21/6112* (2013.01); *H04N 21/65* (2013.01); *H04N 21/654* (2013.01); *H04N 21/80* (2013.01); *H04N 21/85* (2013.01); *H04N 21/8547* (2013.01)

(56) References Cited

PUBLICATIONS

English translation of the International Written Opinion dated Mar. 24, 2017 for corresponding International Application No. PCT/EP2017/052238, filed Feb. 2, 2017.

"Digital Video Broadcasting ( DVB) ; Modulator Interface (T2-MI) for a second generation digital terrestrial television broadcasting system (DVB-T2); Draft ETSI TS 102 773", ETSI Draft; Draft ETSI TS 102 773, European Telecommunications Standards Institute ( ETSI), 650, Route Des Lucioles, F-06921 Sophia-Antipolis, France, vol. Broadcast, No. V1.4.1, Jan. 11, 2016 (Jan. 11, 2016), pp. 1-56, XP014274872.

International Preliminary Report on Patentability and English translation of the International Written Opinion dated Aug. 7, 2018, for corresponding International Application No. PCT/EP2017/052238, filed Feb. 2, 2017.

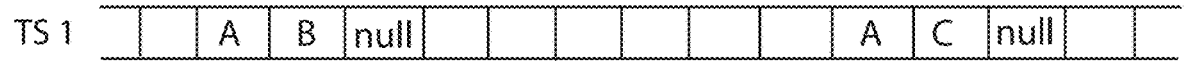
Fig. 7A
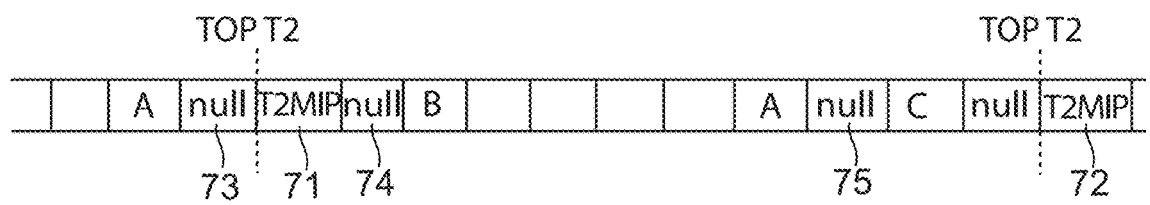
Fig. 7B
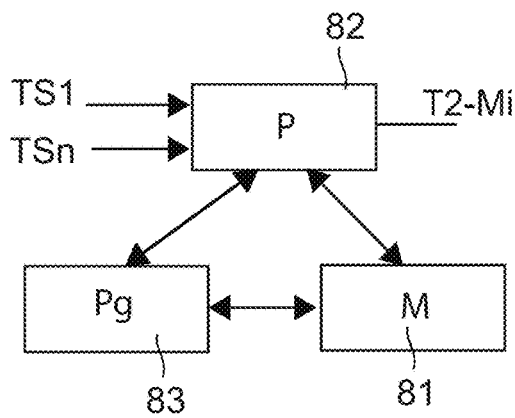 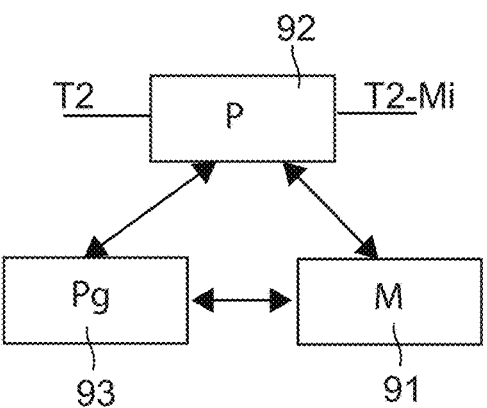
Fig. 8  Fig. 9

METHOD AND PIECE OF EQUIPMENT FOR GENERATING AN ORIGINAL WHOLE DATA STREAM AND A MODIFIED WHOLE DATA STREAM, INTENDED TO BE BROADCAST BY A BROADCASTING SITE AND A REBROADCASTING SITE, RESPECTIVELY

CROSS-REFERENCE TO RELATED APPLICATIONS

This Application is a Section 371 National Stage Application of International Application No. PCT/EP2017/052238, filed Feb. 2, 2017, which is incorporated by reference in its entirety and published as WO 2017/134157 A1 on Aug. 10, 2017, not in English.

1. Field of the invention

The field of the invention is that of the broadcasting of information, especially the terrestrial broadcasting of television services in a broadcasting network comprising a network head-end and a plurality of broadcasting sites, at least one of which is a "main" broadcasting site, here below called a broadcasting site and at least one "secondary" broadcasting site here below called a rebroadcasting site. The term "broadcasting site" or "rebroadcasting site" is understood to be an entity comprising at least one modulator and one transmitter that, if necessary, can be combined within one and the same equipment.

More specifically, the invention relates to a technique for the deterministic generation of a total stream, i.e. a stream that comprises one or more physical layer pipes, each encapsulating a transport stream, and is called a modified total stream, at a rebroadcasting site, from a radiofrequency signal received at the rebroadcasting site. Such a radiofrequency signal is generated by a broadcasting site by the modulating and broadcasting, on a first frequency F1, of an original total stream distributed by a network head-end. The modified total stream thus obtained is designed to be modulated and distributed on a second frequency F2 that can be identical to or distinct from the first frequency F1.

The invention thus proposes a solution for extending a broadcasting network by adding secondary broadcasting sites to it while at the same time preserving synchronization between the different transmitters of the rebroadcasting sites. The broadcasting site or sites can form an SFN (single-frequency network) on the frequency F1, or they can form an MFN (multi-frequency network). The invention thus enables the creation, with the rebroadcasting sites, of SFN sub-networks at the frequency F2. It may be recalled that the SFN networks are conventionally used to improve the coverage of a territory/geographical zone and mitigate the shadow zones related to elements disruptive in transmission (mountains, hills, valleys, large buildings, etc.).

The invention can be applied especially to terrestrial broadcasting networks compliant with the DVB-T2 (Digital Video Broadcasting-Terrestrial) standard or a similar standard or future standards.

2. Prior art

In terrestrial digital broadcasting, all the channels associated with a multiplexer/frequency are managed in a centralized manner in an equipment, commonly called a head-end, in order to create a single signal for all the broadcasting sites implanted on distinct geographical sites. The distribution path used between the head-end and the broadcasting sites is generally a satellite link, but it can also be an IP or "microwave" type link.

The standard most used at present to broadcast terrestrial digital television is the DVB-T standard. This standard is independent of the format of the content; for example, it enables the broadcasting of standard definition services as well as "high-definition" services.

A second version of the DVB-T standard, denoted as DVB-T2, offers greater efficiency in terms of broadcasting, coverage, transport capacity (bit rate) and flexibility.

This second version enables the aggregation, within a same total stream, of several physical layer pipes or PLPs. Each of these physical layer pipes is constituted by a multiplex of contents in an MPEG-2 TS type transport stream disposing of its own modulation parameters. These pipes are brought together within a total stream called a T2-MI (modulator interface) stream. The T2-MI stream comprises T2-MI packets such as synchronization packets (T2-MI timestamp), signaling packets (including the packet known as the T2-MI L1 current packet which provides information on the structure of the T2-MI stream) and packets called baseband frames containing data from the MPEG-2 TS streams of the different pipes.

The structure of such streams is especially described in detail in the document ETSI TR 102 773 "Digital Video Broadcasting (DVB); Modulator Interface (T2-MI) for a second generation digital terrestrial television broadcasting system (DVB-T2)".

By way of an example, FIG. 1 illustrates an example of a broadcasting network according to the DVB-T2 standard. According to this example, the network head-end 11 comprises at least one encoder 111 and one multiplexer 112 generating at least one MPEG-2 TS type transport stream and one DVB-T2 gateway 113 generating an original total stream denoted as the T2-MI stream from the MPEG-2 TS transport stream or streams. The T2-MI stream distributes a plurality of broadcasting sites 131, 13N implanted on distinct geographical sites through a distribution network 12. For example, the broadcasting sites 131, 13N belong to a same SFN hub. Each broadcasting site is equipped with a modulator and a transmitter, possibly combined in a same equipment. From the received T2-MI stream, it generates a radiofrequency signal T2 that can be decoded by classic digital television receivers.

Within the framework of SFN broadcasting, the radiofrequency signals T2 must be finely synchronized. The radiofrequency signals T2 sent out by the transmitters of a same SFN hub are therefore built identically, from the T2-MI packets, and sent out in the form of T2 frames.

In order to extend the range of the broadcasting networks, it has been proposed especially to use the broadcasting sites as relays enabling the transport streams to be transmitted towards rebroadcasting sites.

However, since the radiofrequency signals generated by the broadcasting sites do not carry the totality of the information borne by the T2-MI stream, it is difficult to generate radiofrequency signals at output of the rebroadcasting sites that are finely synchronized. Indeed, the modulators of the rebroadcasting sites do not have access to the T2-MI packets used by the modulators of the broadcasting sites to generate a T2 radiofrequency signal.

There is therefore a need for a novel technique by which a rebroadcasting site can receive a radiofrequency signal and regenerate a radiofrequency signal that is finely synchronized with the radiofrequency signals re-generated by other rebroadcasting sites of a same SFN network.

3. Summary of the invention

The invention thus proposes a novel solution for the rebroadcasting of contents that is compatible with the DVB-T2 standard or other terrestrial digital broadcasting standards and which, according to at least one embodiment, ensures SFN rebroadcasting.

To this end, the invention proposes a method for generating an original total stream intended for being distributed to at least one broadcasting site, comprising a modulator and a transmitter transmitting a radiofrequency signal on a first frequency implementing the following steps:

- obtaining at least one transport stream comprising at least one transport packet,
- obtaining, from at least one modulation parameter for said broadcasting site, at least one starting instant of a modulation frame intended for transmission by said broadcasting site,
- inserting at least one modulation information packet in said at least one transport stream, at a position determined from said at least one starting instant,
- generating said original total stream, comprising at least one physical layer pipe encapsulating said at least one transport stream carrying said at least one modulation information packet.

The original total stream thus generated carries at least one modulation information packet, for example one modulation information packet per transport stream intended for transmission in a modulation frame, inserted in a particular position in the transport stream. In particular, this position is determined from a starting instant of the modulation frame that is to be sent by a broadcasting site. This starting instant is determined at a head-end that generates the original total stream and distributes this original total stream to different broadcasting sites.

For example, in the context of the DVB-T2 standard, such an original total stream is of the T2-MI type, comprising at least one PLP-type physical layer pipe encapsulating at least one T5 stream carrying at least one modulation information packet of the T2-MIP type. A modulation frame intended to be sent by the broadcasting site is of the T2-frame type and the starting instant of such a frame is given by a T2-frame pulse.

In this context, such a method can be implemented in the T2-Gateway.

Such modulation information packets, inserted at particular positions, could be used to rebuild a total stream, called a modified total stream, at least at one rebroadcasting site, from a radiofrequency signal broadcast by a broadcasting site and received by a rebroadcasting site. In particular, such a technique enables the rebuilding of a modified total stream in a deterministic manner, thus ensuring an SFN rebroadcasting at the rebroadcasting sites.

According to one first embodiment, the step of insertion implements, for at least one transport stream, a replacement of the first null transport packet, following said starting instant, by a modulation information packet.

In particular, according to this first embodiment, the modulation information packet carries configuration data comprising:

- a piece of information on offset between said starting instant and the time associated with the modulation information packet inserted into said transport stream,
- a value of a counter associated with a transport packet of said transport stream at said starting instant, called a counter starting value.

For example, such a piece of offset information is expressed in number of bytes.

This first embodiment therefore relies on the addition of configuration data to the modulation information packet or packets, for example private data or standardized data enabling the rebuilding of the modified total stream at one rebroadcasting site at least. It can be noted that this first embodiment relies on the replacement of a null packet of a transport stream by a modulation information packet and therefore does not modify the bit rate of the transport stream.

According to a second embodiment, the step of insertion, for at least one transport stream, implements an insertion of the modulation information packet at the starting instant.

In particular, the step of insertion also implements an insertion of at least one null packet so as to adapt the bit rate of the transport stream.

This second embodiment therefore enables the generation, at a broadcasting site, of a radiofrequency signal formed by at least one modulation frame, the first packet of which is of the modulation information packet type.

In particular, this second embodiment relies on a matching of the bit rate between the transport stream without modulation information packet and the transport stream with modulation information packet to attain the maximum bit rate permitted for encapsulating the transport stream in a physical layer pipe.

It can be noted that this second embodiment relies on the insertion of modulation information packets at particular positions, without requiring the addition of configuration information in the modulation information packets.

In another embodiment, the invention relates to an equipment for generating a corresponding original total stream, said original total stream being intended for being distributed to at least one broadcasting site, comprising a modulator and a transmitter sending a radiofrequency signal at a first frequency.

In particular, such an equipment comprises at least one programmable element, such as a processor, a DSP, an FPGA and the like, suited to implementing at least one step of the method for generating an original total stream described here above. This is for example a T2-Gateway type gateway of a network head-end.

Such an equipment could of course comprise the different characteristics of the method for generating an original total stream according to the invention. These characteristics can be combined or taken in isolation. Thus, the characteristics and advantages of this equipment are the same as those of the method for generating an original total stream. They are therefore not described in more ample detail.

The invention also relates to the generation or rebuilding of a modified total stream intended for a modulator and a transmitter of at least one rebroadcasting site, implementing the following steps:

- receiving a radiofrequency signal comprising at least one modulation frame carrying at least one transport stream and at least one modulation parameter for said at least one transport stream,
- said at least one transport stream carrying at least one modulation information packet inserted at a position determined from said at least one modulation parameter, said radiofrequency signal being generated by a broadcasting site by modulating a total original stream and broadcasting said modulated stream on a first frequency, said original total stream comprising at least one physical layer pipe encapsulating said at least one transport stream, for at least one of said modulation frames, determining, from said at least one modulation parameter, at least one piece of signaling information and a number of baseband frames assigned to said at least one transport stream,
for at least one of said transport streams of said modulation frame:
extracting said modulation information packet,
determining, from said modulation information packet, a starting instant of said modulation frame and at least one synchronization packet,
distributing the transport packets of said modulation frame in the baseband frames assigned to said transport stream,
generating the modified total stream comprising at least one physical layer pipe encapsulating said at least one transport stream from said at least one piece of signaling information, said at least one synchronization packet and said baseband frames, said modified total stream being intended for modulation by said modulator and broadcast by said transmitter on a second frequency that can be identical to or distinct from the first frequency.

According to the invention, the modulation information packet or packets, inserted at particular positions, as well as the modulation parameters are used to rebuild a total stream, called a modified total stream, at one rebroadcasting site at least, from a radiofrequency signal broadcast by a broadcasting site and received by a rebroadcasting site.

In particular, such a method is intended for rebuilding a modified total stream from a radiofrequency signal broadcast by a broadcasting site obtained by modulating and sending out the original total stream generated according to the method for generating an original total stream described here above.

In this way, it is made sure that the synchronization of the radiofrequency signals broadcast by the different rebroadcasting sites receive the same radiofrequency signal.

For example, in the context of the DVB-T2 standard, the modulation parameters are of the T2 parameter type and define for example a number of PLPs in a T2 frame, a number of BB frames for each PLP, a type of constellation for each PLP, a type of encoding, etc. These T2 parameters are used to build at least one T2-MI signaling packet of an L1 type. The T2-MI packet or packets are used to build at least one T2-MI timestamp type of T2-MI synchronization packet.

The modified total stream thus rebuilt is of the T2-MI type comprising at least one physical layer pipe of the PLP type, encapsulating at least one TS stream.

According to a first embodiment, said at least one modulation information packet carrying configuration data comprising:
a piece of information on offset between a starting instant of a modulation frame and the time associated with the modulation information packet inserted into said transport stream,
a value of a counter associated with a transport packet at said starting instant, called a counter starting value,
said step for determining a starting instant of said modulation frame determines said starting instant from said information on offset and the time associated with said modulation information packet.

In particular, after extraction of the configuration data for a modulation information packet, the starting instant of the modulation frame is determined by offsetting this instant with the value of the time associated with the modulation information packet by a number of bytes corresponding to the information on offset.

According to this first embodiment, the method also comprises a step for assigning said counter starting value to a transport packet associated with said starting instant (for a modulation frame indexed P, ISCR(P)=ISCR_t2fr(P)), and for determining the values of a counter associated with the following transport packets.

For example, the step for determining the values of a counter associated with the following transport packets implements the following formula:

$$ISCR(n)=ISCR\_t2fr(P)+(ISCR\_t2fr(P)-ISCR\_t2fr(P+1))/NbPacket(P)*Ni$$

with:
ISCR(n) being the value of the counter associated with a current packet,
P the index of the modulation frame,
ISCR_t2fr(P) the value of the counter associated with a transport packet at the starting instant of the modulation frame indexed P,
ISCR_t2fr(P+1) a value of a counter associated with a transport packet at the starting instant of the modulation frame indexed P+1,
NbPacket(P) the number of entire transport packets in the modulation frame indexed P,
Ni is the number of transport packets since the start of the modulation frame.

According to a second embodiment, the step for determining a starting instant of said modulation frame determines said starting instant from the time associated with said modulation information packet.

Indeed, a modulation information packet does not carry configuration data according to this second embodiment, but is inserted into the transport stream so as to be the first packet of a modulation frame of the radiofrequency signal sent out by the broadcasting site.

According to this second embodiment, the method also comprises a step for determining a value of a counter associated with said modulation information packet from a timestamp carried by said modulation information packet.

For example, in the context of the DVB-T2 standard, such a timestamp is of the T2_timestamp_MIP type expressed in absolute time. The timestamp is thus transposed into an ISCR reference clock (input stream reference clock) for the modified total stream.

In particular, such a method comprises a step for determining values of a counter associated with the following transport packets from the value of the counter associated with said modulation information packet and from a number of null packets added to said transport stream during the generation of said original total stream.

This determining step takes account especially of the matching of the bit rate implemented on the network head-end side between the transport stream without modulation information packets and the transport stream with modulation information packets.

In another embodiment, the invention relates to an equipment for generating (or rebuilding) a corresponding modified total stream, said modified total stream being intended for a modulator and a transmitter of at least one rebroadcasting site.

In particular, such an equipment comprises at least one programmable element, such as a processor, a DSP, an FPGA, and the like, adapted to implementing at least one step of the method for generating a modified total stream described here above. This is for example a novel equipment equipping a rebroadcasting site or integrated at the entry to a modulator or at the exit from a radiofrequency receiver of the rebroadcasting site.

Such an equipment could of course comprise the different characteristics pertaining to the method for generating a modified total stream according to the invention, which can be combined or taken in isolation. Thus, the characteristics and advantages of this equipment are the same as those of the method for generating a modified total stream. They are therefore not described in greater detail.

In one particular embodiment, the different steps of the methods according to the invention are determined by computer program instructions.

The invention therefore also aims to protect one or more computer programs comprising instructions adapted to implementing the method for generating an original total stream or modified total stream as described here above when this program or these programs are executed by a processor as well as at least one computer-readable information medium comprising instructions for at least one computer program as mentioned here above.

4. List of figures

Other features and advantages of the invention shall appear more clearly from the following description of a particular embodiment given by way of a simple illustratory and non-exhaustive example and from the appended figures, of which:

Figure 3:
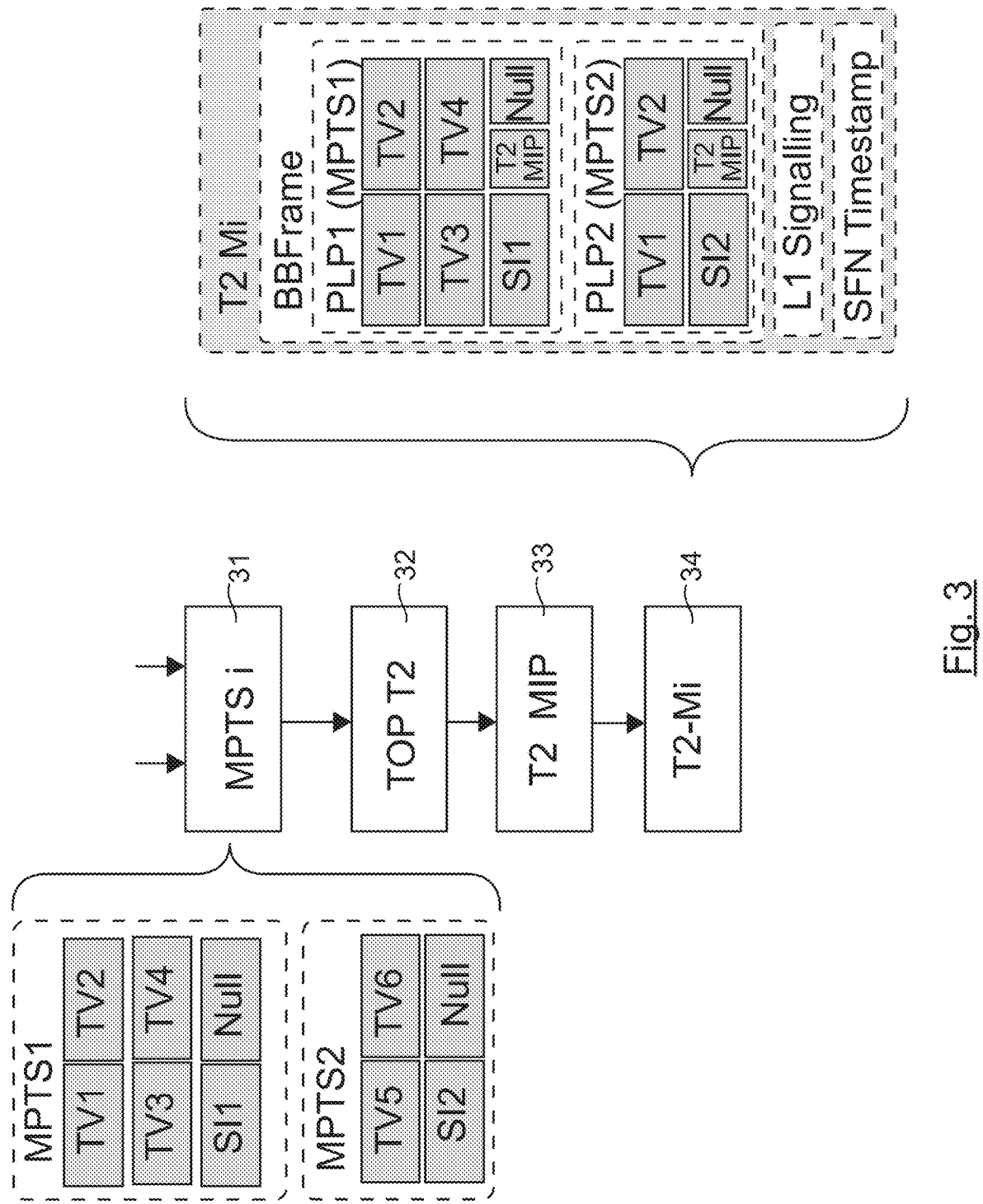
Figure 4:
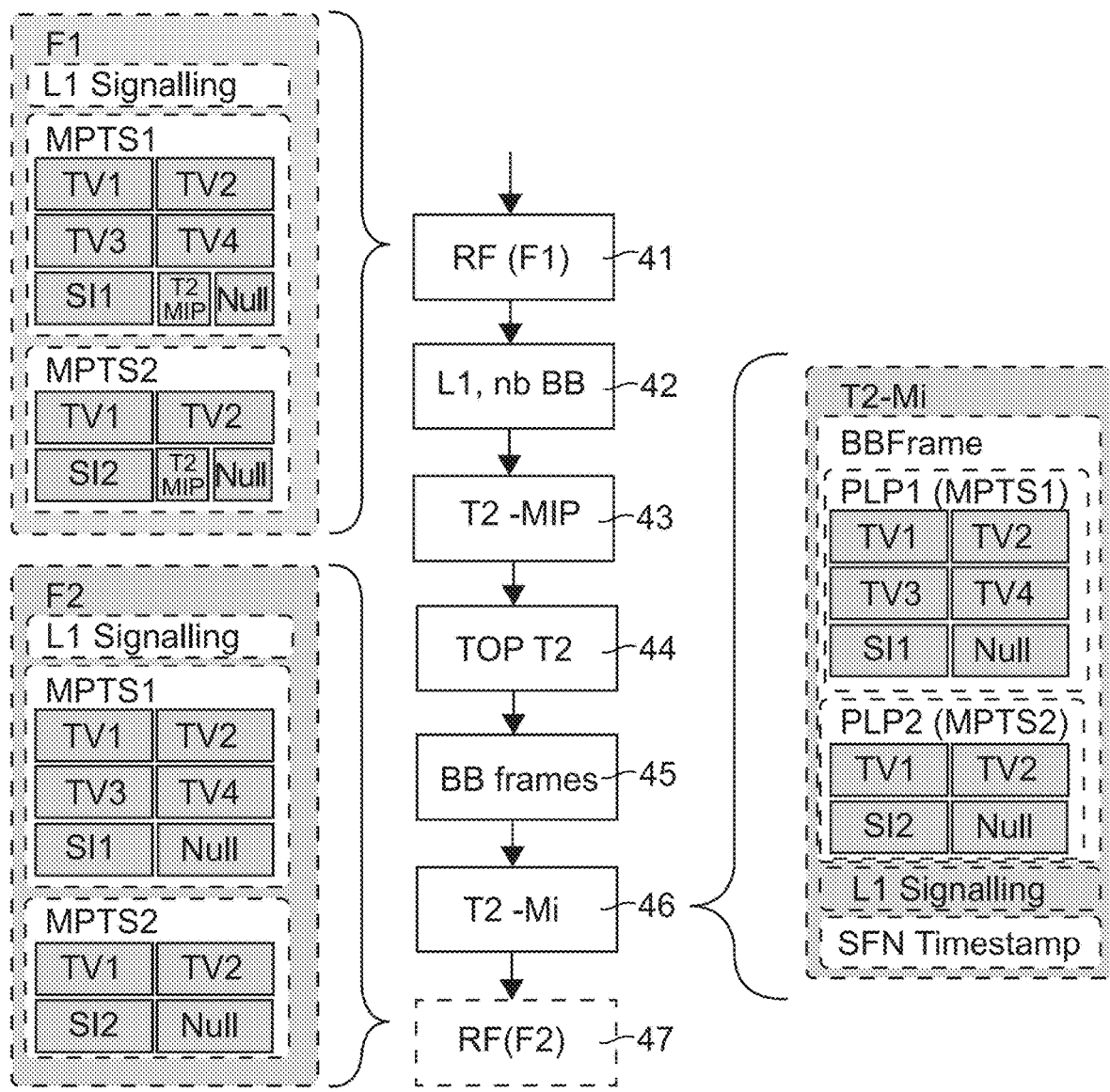
Figure 5A:
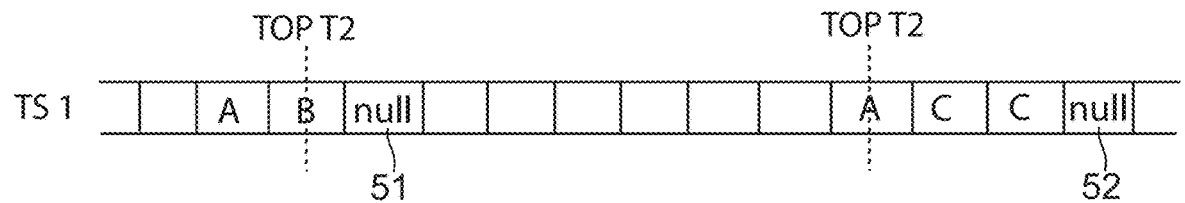
Figure 5B:
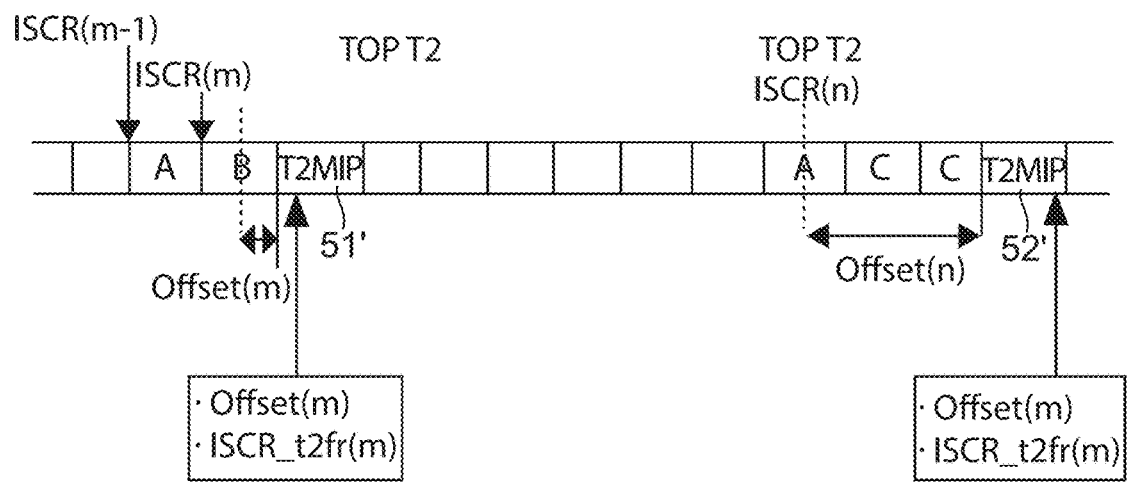
Figure 6:
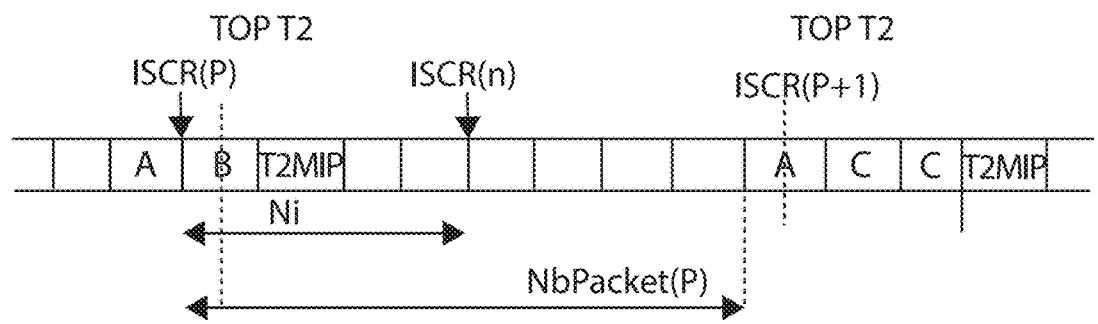

FIGS. 3 and 4 present the main steps of a method for generating an original total stream and a modified total stream, respectively, according to a particular embodiment of the invention;

FIGS. 5A, 5B and 6 illustrate a first embodiment of the invention;

FIGS. 7A and 7B illustrate a second embodiment of the invention;

FIGS. 8 and 9 present the simplified structure of an equipment for generating an original total stream and a modified total stream, respectively, according to one particular embodiment of the invention.

5. Description of one embodiment of the invention

5.1 General Principle

The invention is situated in the context of broadcasting networks comprising at least:
- one network head-end to generate and distribute an original total stream,
- at least one broadcasting site to send out a radiofrequency signal built from the original total stream, and
- at least one rebroadcasting site to generate a modified total stream from the radiofrequency signal built from the original total stream and send out a radiofrequency signal built from the modified total stream.

The general principle of the invention relies on the insertion of at least one modulation information packet into at least one transport stream, at a specific position, enabling the generation of an original total stream in the network head-end and then the rebuilding of a modified total stream in the rebroadcasting site in a deterministic manner.

Figure 1:
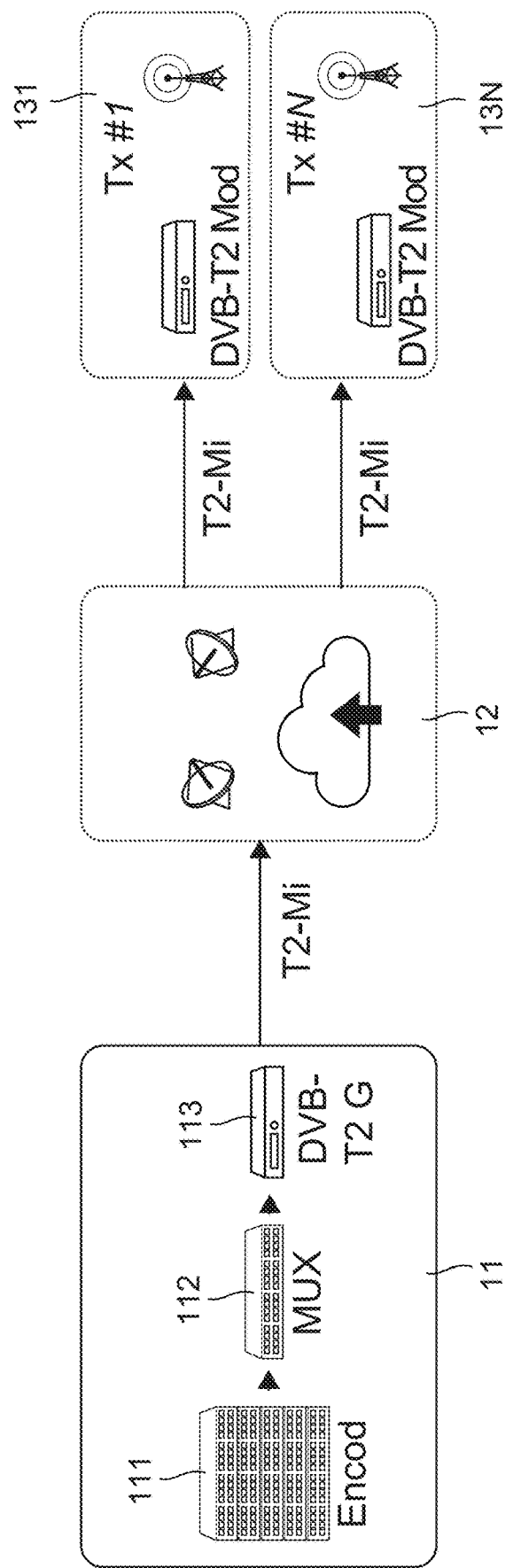
FIG. 1 illustrates an example of a broadcasting network according to the prior art.
Figure 2:
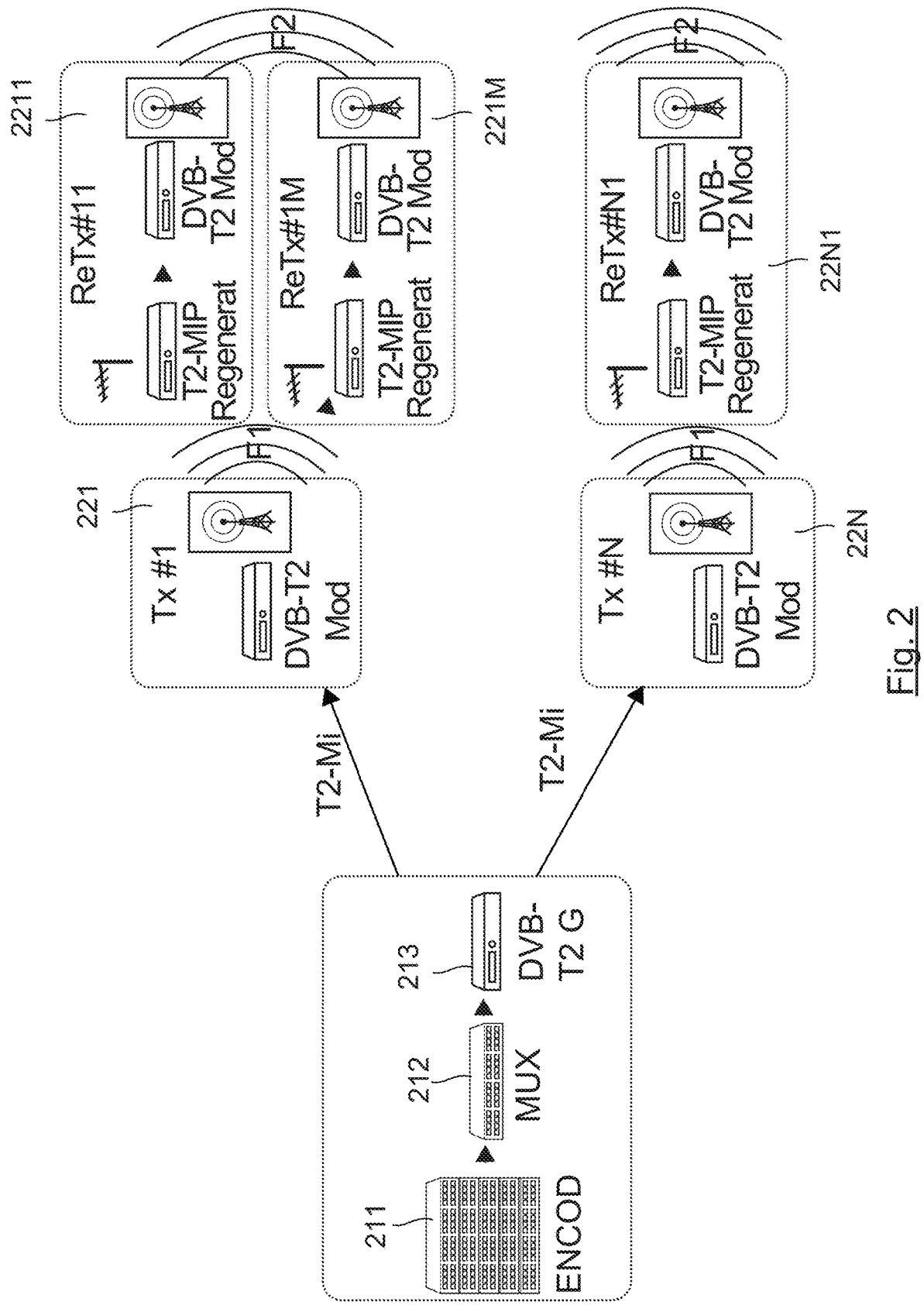
FIG. 2 illustrates an example of a broadcasting network in which the invention can be implemented.

FIG. 2 illustrates an example of such a broadcasting network according to the DVB-T2 standard, capable of implementing the invention, comprising:
- a network head-end 21, comprising at least one encoder 211 and one multiplexer 212, generating at least one MPEG-2 TS type transport stream, and a "DVB-T2 Gateway" 213 generating an original total stream, denoted as the T2-MI stream, from the MPEG-2 TS transport stream;
- one or more broadcasting sites 221, 22N implanted in distinct geographical sites receiving the T2-MI stream distributed by a distribution network (satellite IP, etc.) and comprising at least one modulator/transmitter sending out a radiofrequency signal built from the original total stream, for example in an SFN broadcast at a frequency F1; and
- one or more rebroadcasting sites (2211, 221M, 22N1), forming one or more sub-networks of at least one broadcasting site (for example the 2211 and 221M rebroadcasting sites form a sub-network of the broadcasting site 221; the rebroadcasting site 22N1 forms a sub-network of the broadcasting site 22N). Each rebroadcasting site comprises an equipment receiving the radiofrequency signal sent by the broadcasting site of the network to which it belongs, and deterministically generating a modified total stream from the radiofrequency signal and comprising at least one modulator/transmitter sending out a radiofrequency signal built out of the modified total stream, for example in an SFN broadcast at a frequency F2 with F2 possibly equal to F1.

Referring to FIG. 3, we present the main steps implemented for generating an original total stream implemented for example in the "DVB-T2 Gateway" 213.

During a first step 31, the equipment for generating an original total stream receives at least one transport stream, for example in the MPTS (Multiple Program Transport Stream) format. Each transport stream MPTSi (for example, MPTS1, MPTS2) is formed by a set of transport packets comprising data packets (audio, video, subtitles, etc.), signaling packets (S11, S12) and null packets (NULL). Each transport stream carries one or more contents (television programs, TV1 . . . TV6).

During the second step 32, the equipment for generating an original total stream determines at least one starting instant (T2-frame pulse) of the modulation frames that are to be sent out by the broadcasting sites (221, 22N).

During a third step 33, the equipment for generating an original total stream inserts at least one modulation information packet into the transport stream or streams, at a position determined from at least one starting instant (T2-frame pulse).

Finally, in a fourth step 34, an original total stream comprising at least one physical layer pipe is generated, each physical layer pipe encapsulating a transport stream carrying at least one modulation information packet. Such a total stream, for example of the T2-MI type, is generated in a conventional way, from modified transport streams (i.e. from transport streams carrying at least one modulation information packet). Such a total stream comprises synchronization packets ("T2-MI timestamp" or "SFN timestamp"), signaling packets ("L1") and baseband frames or BB frames containing data on the MPEG-2 TS streams of the different pipes, including modulation information packets.

Such an original total stream is then distributed to the different broadcasting sites (221, 22N). Each broadcasting site (221, 22N) receives the original total stream, for example of a T2-MI type, modulates it and broadcasts it to at least one rebroadcasting site, for example on a frequency F1. The radiofrequency signal RF(F1) thus built is intended for decoding by classic digital television receivers. It therefore carries only one part of the information of the original total stream. Indeed, certain pieces of information of the original total stream are used by the modulator of the broadcasting site to generate the radiofrequency signal but are not broadcast by the transmitter of the broadcasting site. Other pieces of information on the original total stream can be transmitted in the radiofrequency signal but are not directly available at the rebroadcasting sites. For example, the distribution of the transport packets in the baseband frames or the counter values, of the ISCR type counter for example, associated with the total original stream are not information elements directly available in the rebroadcasting sites.

FIG. 4 illustrates the main steps implemented for the generation of the modified total stream implemented in a rebroadcasting site (2211, 221M, 22N1).

During a first step 41, an equipment for generating a modified total stream receives the radiofrequency signal RF(F1). Such a signal comprises at least one modulation frame carrying at least one transport stream and at least one modulation parameter for the transport stream or streams. According to the DVB-T2 standard for example, such a signal comprises at least one T2 frame carrying at least one TS stream and T2 parameters.

For at least one modulation frame, such an equipment, in a second step 42 and on the basis of the modulation parameters, determines at least one piece of signaling information and a number of baseband frames allocated or assigned to the transport stream or streams.

For at least one transport stream of the modulation frame, the modulation information packet and the data that it contains are extracted in a third step 43 and then, in a fourth step 44, a starting instant of the modulation frame and at least one synchronization packet ("T2-MI timestamp" or "SFN timestamp") are determined from the modulation information packet. Finally, in a fifth step 45, the transport packets of the modulation frame are distributed in the baseband frames according to the number of baseband frames assigned to the transport stream.

During a sixth step 46, a modified total stream, comprising at least one physical layer pipe encapsulating at least one transport stream, is generated from the signaling information, the signaling packet or packets and the baseband frames. Such a total stream, for example of the T2-MI type, is generated conventionally from modified transport streams (i.e. from transport streams from which a modulation information packet is removed).

The modified total stream thus obtained is meant to be modulated by a modulator and broadcast by a transmitter of the rebroadcasting site on a second frequency (signal RF(F2), 47) that may or may not be distinct from the first frequency. Such a radiofrequency signal RF(F2) can be decoded by classic digital television receivers.

A modified total stream can thus be built deterministically at each rebroadcasting site, enabling especially an SFN broadcasting of the radiofrequency signal RF(F2) from the different transmitters of the rebroadcasting sites belonging to a same sub-network. For example, the radiofrequency signals coming from the rebroadcasting sites 2211 and 221M are finely synchronized in time and in frequency.

It can also be noted that the different steps described here above can be implemented sequentially or in parallel, possibly in a different order from the one indicated.

5.2 Examples of Implementation

Here below, we present two detailed examples of implementation of the invention.

The context of these examples is that of a DVB-T2 type broadcasting standard according to which the original total stream and the modified total stream are of the T2-MI type and each transport stream is encapsulated in a physical layer pipe PLP. The T2-MI streams generated can therefore be mono-PLP or multi-PLP streams.

The modulation information packet is a T2-MIP packet as presented in the document ETSI TS 102 773 mentioned here above. The structure of such a T2-MIP packet is especially described in the table B.1 ("DVB-T2 Modulator Information Packet (T2-MIP)").

A) First Embodiment

Referring to FIGS. 5A and 5B, we present a first exemplary embodiment, based on the addition of configuration data (for example private or standardized data) in the T2-MIP packet or packets.

According to this first embodiment, an equipment for generating an original total stream, for example of the T2-gateway type, receives one or more TS streams and determines at least one starting instant (T2-frame pulse) of the T2 frames that are meant to be sent out by the broadcasting sites, from at least one T2 modulation parameter for the broadcasting sites of the broadcasting network. The first T2-frame pulse can be determined randomly, for example when putting the equipment into operation or else it can be fixed by an external source.

The equipment can then determine the following T2-frame pulses through knowledge of the length of the T2 frames obtained from the T2 parameters.

FIG. 5A illustrates the transport packets (A, B, C, zero, etc.) of an incoming transport stream TS1 and the starting instants for the T2 frames that will be generated at the broadcasting site or sites. It can be noted that, if several transport streams are considered, the starting instants for the T2 frames will be identical for all the transport streams.

According to this first embodiment, a null packet of a transport stream following a T2-frame pulse ("TOP T2"), for example the first null packet following this T2-frame pulse, is replaced by a T2-MIP packet.

Thus, as illustrated in FIG. 5B, the first null packet following a T2-frame pulse (51, 52) is replaced by a T2-MIP packet (51', 52').

According to this first embodiment, configuration information is added to the T2-MIP packet, comprising:
  a piece of "offset" information between the T2-frame pulse and the start of the T2-MIP packet inserted as a replacement of a null packet following the T2-frame pulse expressed for example in number of bytes,
  a value of a counter associated with a transport packet of the TS stream at the T2-frame pulse, called a counter starting value "ISCR_t2fr". In other words, the T2-MIP packet is assigned the value of the counter of the transport packet at the instant of the T2-frame pulse: ISCR_t2fr=ISCR(m). It may be recalled that the ISCR (Input Stream Clock Reference) field is a counter on 22 bits incremented at each new T2 elementary period. In particular, during the T2 framing for radiofrequency transmission of the total stream, this counter is sampled and inserted into the header of a baseband frame.

It can be noted that, according to this first embodiment, there is no matching of bit rate between the incoming transport stream or streams and the modified transport stream or streams by the insertion of a T2-MIP packet.

Once the T2-MIP packet or packets, carrying the configuration information, have been inserted into the transport stream or streams, the T2 gateway implements the T2-MI encapsulation. Each transport stream is encapsulated in one or more "BB frames" (forming a PLP carrying a T2-MIP packet). "T2MI-timestamp" synchronization packets and "T2MI-L1" signaling packets are also generated in a conventional way.

The T2 gateway outputs a T2-MI stream, called an original total stream, which is a mono-PLP in the case of a single transport stream, or a multi-PLP in the case of several transport streams, distributed to one or more broadcasting sites.

The broadcasting site or sites receive the T2-MI stream distributed by the T2 gateway, modulate it and send it out in radiofrequency over the air, in the form of T2 frames, in mono-PLP mode or multi-PLP mode.

The rebroadcasting site or sites receive the radiofrequency signal sent by the broadcasting sites and refresh a T2-MI stream from the transport stream or streams carried by the radiofrequency signal.

More specifically, an equipment for generating a modified total stream, located in a rebroadcasting site, retrieves the modulation parameters for modulating the transport stream carried by the radiofrequency signal, i.e. the T2 parameters, and uses this information to regenerate at least one piece of signaling information and determine the number of baseband frames (BB frames) per T2 frame for each PLP.

According to this first embodiment, for at least one T2 frame received and for at least one TS stream received, corresponding to a PLP, the equipment for generating a modified total stream scans the TS stream, identifies the T2-MIP packet and extracts the preliminarily inserted configuration data from it.

The generating equipment thus has available, for this TS stream for this T2 frame, information on offset between the T2-frame pulse and the start of the T2-MIP packet, and the counter starting value "ISCR_t2fr". It also has the timestamp, T2_timestamp_MIP, conventionally inserted into the T2-MIP packet.

From the information on offset, the generation equipment can detect the starting instant of the T2 frame (T2-frame pulse) carrying this TS stream/this PLP.

It is noted, that in the multi-PLP case, a T2 frame carries several T2-MIP packets (one per PLP). In this case, the timestamp, T2_timestamp_MIP, is identical for all the T2-MIP packets of a same T2 frame. By contrast, the configuration data can differ from one T2-MIP packet to another within a same T2 frame.

According to a first example, the equipment for generating a modified total stream stores, in a buffer memory, all the data carried by a same T2 frame, i.e. the transport packets of a TS stream. For each T2 frame, it determines the quantity of data stored in the buffer memory and distributes the data in baseband frames, for example by dividing the quantity of data for a current T2 frame by the number of baseband frames per T2 frame (determined from the T2 modulation parameters). Thus, for each baseband frame, a constant number of payload bits/bytes are obtained. If necessary, the remaining bits/bytes of the baseband frames are filled with padding bits/bytes.

According to a second example, the equipment for generating a modified total stream fills the first baseband frames with data carried by a T2 frame and then fills in the remaining baseband frame or frames with padding bits/bytes.

The equipment for generating a modified total stream also refreshes an ISCR type counter for the modified total stream.

More specifically, having determined the starting instant of a T2 frame (T2-frame pulse) from the offset information carried by a T2_MIP packet associated with a TS stream, the piece of generation equipment can assign the counter starting value "ISCR_t2fr" to the transport packet at the starting instant of a T2 frame (T2-frame pulse). For a T2 frame indexed P, ISCR(P)=ISCR_t2fr(P).

We can then determine the ISCR counter values associated with the following transport packets in the T2 frame indexed P from the following formula:

$$ISCR(n)=ISCR\_t2fr(P)+(ISCR\_t2fr(P)-ISCR\_t2fr(P+1))/NbPacket(P)*Ni$$

with:
- ISCR(n) being the value of the counter associated with a current transport packet,
- ISCR_t2fr(P) the counter starting value,
- NbPacket(P) the number of entire transport packets in the modulation frame indexed P,
- Ni is the number of transport packets from the start of the modulation frame.

For example, FIG. 6 illustrates the refreshing of the ISCR counter for a T2 frame indexed P.

Finally, the timestamp T2_timestamp_MIP obtained from the T2-MIP packet is used to rebuild at least one T2-MI synchronization packet ("T2-MI timestamp" or "SFN timestamp").

The signaling information is also encapsulated in a T2-MI signaling packet ("L1-Current").

The piece of generation equipment then implements the T2-MI encapsulation from the synchronization packet or packets, the signaling packet or packets and the BB frames so as to deterministically generate a T2-MI stream, called a modified total stream, mono-PLP or multi-PLP.

B) Second Embodiment

Here below, referring to FIGS. 7A and 7B, we present a second exemplary embodiment relying on the insertion of classic T2-MIP packets at particular positions in the T2 frames.

According to this second embodiment, an equipment for generating an original total stream, for example of the T2 gateway type, receives one or more TS streams and determines at least one starting instant (T2-frame pulse, or "T2 TOP") of the T2 frames, intended for transmission by broadcasting sites, from at least one T2 parameter for modulating broadcasting sites of the broadcasting network.

FIG. 7A illustrates transport packets (A, B, C, null, etc.) of an incoming transport stream TS1.

According to this second embodiment, at least one T2-MIP packet is inserted into the transport stream starting at the starting instants T2-frame pulse for the T2 frames which will be generated at the broadcasting site or sites. One or more null packets are also inserted so as to adapt the bit rate of the incoming TS streams. In particular, the T2-MIP packet can be inserted to replace a null packet.

More specifically, the value of the bit rate of the incoming TS streams is modified to attain a maximum transmission bit rate for a PLP, rounded out to a lower value so as to transmit a number of entire transport packets per T2 frame.

Thus, as illustrated in FIG. 7B, the first packet following a T2-frame pulse is a T2-MIP packet (71, 72) and null packets (73, 74, 75) are inserted into the transport stream so as to transmit a number of entire transport packets per T2 frame.

Since the T2-MIP packets are inserted at the starting instants of the T2 frames which will be generated at the broadcasting site or sites, they enable the T2 frames to be delimited.

It will be noted that, according to this second embodiment, it is not necessary to add configuration data to the T2-MIP packets. In this embodiment, conventional T2-MIP packets are therefore used, as defined in the standard, but are placed at specific positions enabling the detection of the start of the T2 frames.

Once the T2-MIP packet or packets are inserted into the transport stream or streams, the T2 gateway implements the T2-MI encapsulation. Each transport stream is encapsulated in one or more "BB frames" (forming a PLP carrying a T2-MIP packet). "T2MI-timestamp" synchronization packets and "T2MI-L1" signaling packets are also generated conventionally. It can be noted that, conventionally, the "T2MI-timestamp" synchronization packets carry a DVB-T2 timestamp denoted as T2-timestamp used to synchronize the outputs of the different modulators of the broadcasting sites, expressed in absolute time or relative time. This is described especially in the document ETSI TS 102 773 mentioned here above.

In this second embodiment, the DVB-T2 timestamp carried by the "T2MI-timestamp>>" synchronization packets is considered as being expressed in absolute time. A "seconds_since_2000" counter counting the number of seconds since 1 Jan. 2000, 0h00 UTC, is therefore non zero.

The T2 gateway outputs a T2-MI stream, called an original total stream. It is a mono-PLP stream if we consider only one transport stream or a multi-PLP stream if we consider several transport streams distributed to one or more broadcasting sites.

The broadcasting site or sites receive the T2-MI stream distributed by the T2 gateway, modulate it and send it out in a radiofrequency form (i.e. over the air), in the form of T2 frames, grouped in super frames in mono-PLP mode or multi-PLP mode.

The rebroadcasting site or sites receive the radiofrequency signal sent by the broadcasting site or sites and regenerate a T2-MI stream from the transport stream or streams carried by the radiofrequency signal.

More specifically, an equipment for generating a modified total stream, located in a rebroadcasting site, retrieves the modulation parameters of the transport streams carried by the radiofrequency signal, i.e. the T2 parameters, and uses this information to regenerate at least one piece of signaling information and determine the number of baseband frames or "BB frames" per T2 frame for each PLP.

According to this second embodiment, for at least one T2 frame received of a super frame and for at least one TS stream, corresponding to a PLP, the equipment for generating a modified total stream scans the TS stream and identifies the T2-MIP packet. From the T2-MIP packets, inserted at the starting instants of the T2 frames according to this second embodiment, the generating equipment determines the starting instants of the T2 frames (T2-frame pulse) of the super frame and extracts the T2_timestamp_MIP timestamp, conventionally inserted into the T2-MIP packet. It will be noted that the T2_timestamp_MIP timestamp is identical for all the T2-MIP packets of the T2 frames of a super frame.

For each T2 frame of a super frame, it fills the first baseband frames with incoming transport packets. If the last baseband frames are not completed, padding bits/bytes are added to fill them.

The equipment for generating a modified total stream also refreshes an ISCR type counter for the modified total stream.

If the T2_timestamp_MIP timestamp is expressed in terms of absolute time, like the DVB-T2 timestamp carried by the "T2MI-timestamp" synchronization packets, then it can be transposed to the ISCR format so as to determine the counter value associated with the current T2-MIP packet, using the following formula:

$$T2\_timestamp\_MIP = seconds\_since\_2000 + subseconds*Tsub$$

with:
  seconds_since_2000 being a counter counting the number of seconds since 1 Jan. 2000, 0h00 UTC;
  sub-seconds, a number of units of fractions of a second;
  Tsub, a unit of a fraction of a second.

Such fields are especially defined in the document ETSI TS 102 773 mentioned here above. In particular, according to this document, the relationship between a T2 elementary period, denoted T, and a unit constituted by a fraction of a second denoted as Tsub is defined as follows:

| Bandwidth | Bandwidth field (bw) | Elementary T2 period, T | Fraction-of-second unit, Tsub |
| --- | --- | --- | --- |
| 1.7 MHz | $0_{16}$ | 71/131 μs | 1/131 μs |
| 5 MHz | $1_{16}$ | 7/40 μs | 1/40 μs |
| 6 MHz | $2_{16}$ | 7/48 μs | 1/48 μs |
| 7 MHz | $3_{16}$ | 7/56 μs | 1/56 μs |
| 8 MHz | $4_{16}$ | 7/64 μs | 1/64 μs |
| 10 MHz | $5_{16}$ | 7/80 μs | 1/80 μs |

The T2_timestamp_MIP timestamp, expressed as a function of T, can therefore be expressed as follows:

$$T2\_timestamp\_MIP/Tsub = seconds\_since\_2000/Tsub + subseconds$$

$$T2\_timestamp\_MIP/T = seconds\_since\_2000/T + subseconds/7$$

In addition, since the counter ISCR is a 22-bit counter based on an elementary T2 period, the counter value of the T2-MIP packet of the modulation frame indexed P in the super frame, denoted as ISCR(T2-MIP(p)), can be expressed as follows:

$$ISCR(T2-MIP(p)) = seconds\_since\_2000/T + subseconds/7 \bmod{(2^{22})}$$

Finally, with knowledge of the bit rate of a transport stream carrying a T2-MIP packet, defined as the value of the maximum bit rate of a PLP, rounded out to a lower value so as to have a number of entire transport packets in a T2 frame and an elementary T2 period, it is possible to find the counting pitch ISCR_step between the transport packets and determine a counter value for each transport packet:

$$ISCR(n) = ISCR(T2-MIP(p)) + Ni*ISCR\_step$$

with Ni being the number of transport packets from the start of the super frame.

Finally, the T2_timestamp_MIP timestamp, obtained from the T2-MIP packet is used to rebuild at least one T2-MI synchronization packet ("T2-MI timestamp" or "SFN timestamp").

The signaling information is also encapsulated in a T2-MI signaling packet ("L1-Current").

The generating equipment then implements the T2-MI encapsulation from the synchronization packet or packets, the signaling packet or packets and "BB frames" so as to deterministically generate a T2-MI stream, called a modified total stream, a mono-PLP stream or a multi-PLP stream.

As a variant of this second embodiment, the DVB-T2 timestamp carried by the synchronization packets "T2MI-timestamp" could be expressed in relative time. In this case, the T2-MIP packets inserted into the transport streams could carry configuration data including especially a value of a counter associated with the transport packet of the transport stream at the starting time, called a counter starting value.

5.3 Devices

Finally, referring to FIG. 8 and FIG. 9 respectively, we present the simplified structure of an equipment implementing a technique for generating an original total stream and a modified total stream, respectively, according to one embodiment of the invention.

As illustrated in FIG. 8, a device for generating an original total stream (for example a T2 gateway), comprises a memory 81 (comprising for example a buffer memory) and a processing unit 82 (equipped for example with at least one processor, FPGA or DSP) driven or pre-programmed by an application or a computer program 83 implementing the method for generating a total original stream according to one embodiment of the invention.

At initialization, the program code instructions of the computer program 83 are for example loaded into a RAM and then executed by the processing unit 82. The processing unit 82 inputs at least one transport stream (TS1, TSn). The processing unit 82 implements the steps of the method of generation described here above, according to the instructions of the computer program 83 to generate an original total stream (T2-MI).

FIG. 9 illustrates a device for generating a modified total stream comprising a memory 91 (for example a buffer memory), a processing unit 92 (equipped for example with at least one processor, FPGA or DSP) driven or pre-programmed by an application or a computer program 93 implementing the method for generating a modified total stream according to one embodiment of the invention.

At initialization, the computer program code instructions 93 are for example loaded into a RAM and then executed by the processing unit 92. The processing unit 92 inputs at least one radiofrequency signal carrying at least one transport stream (T2). The processing unit 92 implements the steps of the method of generation described here above, according to the instructions of the computer program 93 to generate a modified total stream (T2-MI).

The invention claimed is:

1. A method for generating an original total stream for being distributed in a broadcasting network to at least one broadcasting site, comprising a modulator and a transmitter sending a radiofrequency signal on a first frequency, wherein the method comprises the following acts performed by equipment of the broadcasting network:
   obtaining at least one transport stream comprising at least one transport packet,
   obtaining, from at least one modulation parameter for said broadcasting site, at least one starting instant of a modulation frame intended for being sent by said broadcasting site,
   inserting at least one modulation information packet in said at least one transport stream, at a position determined from said at least one starting instant,
   generating said original total stream, comprising at least one physical layer pipe encapsulating said at least one transport stream carrying said at least one modulation information packet, and
   distributing the original total stream to the at least one broadcasting site.

2. The method for generating according to claim 1, wherein said inserting act implements, for at least one of said transport streams, a replacement of a first null transport packet, following said starting instant, by said modulation information packet.

3. The method for generating according to claim 2, wherein said modulation information packet carries configuration data, comprising:
   a piece of information on offset between said starting instant and the time associated with the modulation information packet inserted into said transport stream,
   a value of a counter associated with a transport packet of said transport stream at said starting instant, called a counter starting value.

4. The method for generating according to claim 1, wherein said inserting, for at least one of said transport streams, implements an insertion of said modulation information packet at said starting instant.

5. The method for generating according to claim 4, wherein said inserting act also implements an insertion of at least one null packet so as to adapt a bit rate of the transport stream.

6. The method for generating according to claim 1, wherein said original total stream is of a T2-MI type and said at least one modulation information packet is of a T2-MIP type.

7. A method for generating a modified total stream by equipment of at least one rebroadcasting site comprising a modulator and a transmitter wherein the equipment implements the following acts:
   receiving a radiofrequency signal comprising at least one modulation frame carrying at least one transport stream and at least one modulation parameter for said at least one transport stream,
   said at least one transport stream carrying at least one modulation information packet inserted at a position determined from said at least one modulation parameter,
   said radiofrequency signal being generated by a broadcasting site by modulating a total original stream and broadcasting said modulated stream on a first frequency,
   said original total stream comprising at least one physical layer pipe encapsulating said at least one transport stream,
   for at least one of said modulation frames, determining, from said at least one modulation parameter, at least one piece of signaling information and a number of baseband frames assigned to said at least one transport stream,
   for at least one of said transport streams of said modulation frame:
      extracting said modulation information packet,
      determining, from said modulation information packet, a starting instant of said modulation frame and at least one synchronization packet,
      distributing the transport packets of said modulation frame in the baseband frames assigned to said transport stream,
   generating said modified total stream comprising at least one physical layer pipe encapsulating said at least one transport stream from said at least one piece of signaling information, said at least one synchronization packet and said baseband frames, providing said modified total stream to said modulator for modulation by said modulator and broadcast by said transmitter on a second frequency.

8. The method for generating a modified total stream according to claim 7, wherein said at least one modulation information packet carrying configuration data comprises:

a piece of information on offset between a starting instant of a modulation frame and the time associated with the modulation information packet inserted into said transport stream, a value of a counter associated with a transport packet at said starting instant, called a counter starting value, said act of determining a starting instant of said modulation frame determines said starting instant from said information on offset and the time associated with said modulation information packet.

9. The method for generating a modified total stream according to claim 8, further comprising assigning said counter starting value to a transport packet associated with said starting instant, and determining values of a counter associated with the following transport packets.

10. The method for generating a modified total stream according to claim 9, wherein determining the values of a counter associated with the following transport packets implements the following formula:

$$ISCR(n) = ISCR\_t2fr(P) + (ISCR\_t2fr(P) - ISCR\_t2fr(P+1))/NbPacket(P)*Ni$$

with:
ISCR(n) being the value of the counter associated with a current transport packet,
P the index of the modulation frame,
ISCR_t2fr(P) said value of the counter associated with a transport packet at the starting instant of the modulation frame indexed P,
ISCR_t2fr(P+1) a value of a counter associated with a transport packet at the starting instant of the modulation frame indexed P+1,
NbPacket(P) the number of entire transport packets in the modulation frame indexed P,
Ni the number of transport packets since the start of the modulation frame.

11. The method for generating a modified total stream according to claim 7, wherein determining a starting instant of said modulation frame determines said starting instant from the time associated with said modulation information packet.

12. The method for generating a modified total stream according to claim 11, further comprising determining a value of a counter associated with said modulation information packet from a timestamp carried by said modulation information packet.

13. The method for generating a modified total stream according to claim 12, further comprising determining values of a counter associated with the following transport packets, from the value of the counter associated with said modulation information packet and from a number of null packets added to said transport stream during the generation of said original total stream.

14. Equipment for generating an original total stream for being distributed in a broadcasting network to at least one broadcasting site comprising a modulator and a transmitter sending a radiofrequency signal at a first frequency, wherein the equipment comprises:

a processor; and
a non-transitory computer-readable medium comprising instructions stored thereon, which when executed by the processor configure the equipment to perform acts comprising:

obtaining at least one transport stream comprising at least one transport packet, obtaining, from at least one modulation parameter for said broadcasting site, at least one starting instant of a modulation frame intended for being sent by said broadcasting site, inserting at least one modulation information packet in said at least one transport stream, at a position determined from said at least one starting instant, for generating said original total stream, comprising at least one physical layer pipe encapsulating said at least one transport stream carrying said at least one modulation information packet, and distributing the original total stream to the at least one broadcasting site.

15. Equipment for generating a modified total stream for a modulator and a transmitter of at least one rebroadcasting site, wherein the equipment comprises:

a processor; and
a non-transitory computer-readable medium comprising instructions stored thereon, which when executed by the processor configure the equipment to perform acts comprising:

receiving a radiofrequency signal comprising at least one modulation frame carrying at least one transport stream and at least one modulation parameter for said at least one transport stream, said at least one transport stream carrying at least one modulation information packet inserted at a position determined from said at least one modulation parameter, said radiofrequency signal being generated by a broadcasting site by modulating a total original stream and broadcasting said modulated stream on a first frequency, said original total stream comprising at least one physical layer pipe encapsulating said at least one transport stream, for at least one of said modulation frames, determining, from said at least one modulation parameter, at least one piece of signaling information and a number of baseband frames assigned to said at least one transport stream, for at least one of said transport streams of said modulation frame:
extracting said modulation information packet,
determining, from said modulation information packet, a starting instant of said modulation frame and at least one synchronization packet,
distributing the transport packets of said modulation frame in the baseband frames assigned to said transport stream, generating said modified total stream comprising at least one physical layer pipe encapsulating said at least one transport stream from said at least one piece of signaling information, said at least one synchronization packet and said baseband frames, and providing said modified total stream to said modulator for modulation by said modulator and broadcast by said transmitter on a second frequency.

* * * * *